US012267030B2

(12) United States Patent
Edwards et al.

(10) Patent No.: US 12,267,030 B2
(45) Date of Patent: Apr. 1, 2025

(54) SYSTEMS AND METHODS OF DISTRIBUTED AND DYNAMICALLY CONFIGURABLE MOTOR CONTROL

(71) Applicant: Schneider Electric USA, Inc., Andover, MA (US)

(72) Inventors: Benjamin W. Edwards, Rolesville, NC (US); Kevin M. Jefferies, Raleigh, NC (US); Gerald B. Carson, Raleigh, NC (US); Konstantin A. Filippenko, Grenoble (FR); Christian Pillot, Angouleme (FR)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 17/291,091

(22) PCT Filed: Nov. 8, 2019

(86) PCT No.: PCT/US2019/060539
§ 371 (c)(1),
(2) Date: May 4, 2021

(87) PCT Pub. No.: WO2020/097506
PCT Pub. Date: May 14, 2020

(65) Prior Publication Data
US 2022/0006407 A1    Jan. 6, 2022

Related U.S. Application Data

(60) Provisional application No. 62/758,245, filed on Nov. 9, 2018.

(51) Int. Cl.
H02P 23/00    (2016.01)
(52) U.S. Cl.
CPC ............... H02P 23/0077 (2013.01)

(58) Field of Classification Search
CPC .............. H02P 23/0077; H02P 29/028
See application file for complete search history.

(56) References Cited

U.S. PATENT DOCUMENTS

| 8,644,959 | B2 * | 2/2014 | Hermann | ........... G05B 19/0426 700/11 |
| 10,282,285 | B2 * | 5/2019 | Braun | ................. G06F 12/0246 |

(Continued)

FOREIGN PATENT DOCUMENTS

| EP | 0309302 A2 | 3/1989 |
| EP | 0309302 A3 | 9/1990 |

OTHER PUBLICATIONS

International Search Report and Written Opinion mailed Jan. 17, 2020 in PCT/US2019/060539, 16 pp.

(Continued)

*Primary Examiner* — Kawing Chan
(74) *Attorney, Agent, or Firm* — Troutman Pepper Locke LLP

(57) ABSTRACT

Techniques for managing a distributed control system for a motor control switch are described. A request to implement a first controller for a motor control switch is received. Embodiments determine a plurality of functional modules for the first controller. Each of the plurality of functional modules comprises an instance of computer logic configured to perform a respective function. A respective Motor Control Function Set (MCFS) for performing the respective function of each of the plurality of functional modules is determined. One or more of a plurality of configurable hardware blocks are allocated to each of the plurality of functional modules. Embodiments configure each of the plurality of configurable hardware blocks based on the MCFS of the functional module to which the respective configurable hardware block is allocated. The configured plurality of configurable hard- (Continued)

ware blocks is executed as a distributed system to control the motor control switch.

24 Claims, 16 Drawing Sheets

(56) References Cited

U.S. PATENT DOCUMENTS

| | | | |
|---|---|---|---|
| 10,615,589 B2* | 4/2020 | Jeong | H02J 9/00 |
| 2004/0024502 A1* | 2/2004 | Squires | B60L 3/12 |
| | | | 701/2 |
| 2004/0027254 A9 | 2/2004 | Kirstein | |
| 2007/0021873 A1 | 1/2007 | Richards | |
| 2009/0327942 A1 | 12/2009 | Eldridge et al. | |
| 2011/0022751 A1* | 1/2011 | Hrachovec | G05B 19/0426 |
| | | | 710/104 |
| 2011/0241447 A1 | 10/2011 | Ando et al. | |
| 2011/0257934 A1* | 10/2011 | Dimino | G01R 31/343 |
| | | | 702/183 |
| 2016/0020053 A1* | 1/2016 | Dozier | H02P 1/26 |
| | | | 200/50.21 |
| 2018/0233908 A1* | 8/2018 | Chik | H02J 3/38 |

OTHER PUBLICATIONS

European Search Report and Search Opinion dated Jul. 25, 2022 for corresponding European Patent Application No. 19882641.4, 8 pages.

* cited by examiner

| | Bus Coupler | Starter | Safe Starter | PIM | Digital IOM | Analog IOM | VIM | SIM | |
|---|---|---|---|---|---|---|---|---|---|
| Indicate Device Status | | X | X | X | X | X | X | X | |
| Update Device Firmware | | X | X | X | X | X | X | X | Bus Device |
| Manage Device Address | | X | X | X | X | X | X | X | |
| Report Device ID | | X | X | X | X | X | X | X | |
| Report Power Device Status | | X | X | X | | | | | Pwr Device |
| Command Outputs | | | | | X | | | | |
| Indicate Inputs Status | | | | | X | | | | |
| Command Analog Output | | | | | | X | | | |
| Report Analog Inputs Status | | | | | | X | | | |
| Terminate Safe Contactor Status | X | | | | | | | X | |
| Report SIM Status | | | | | | | | X | |
| Report Safe Restart Status | | | | | | | | X | |
| Command Safe Stop Voltage | | | | | | | | X | |
| Report Synchronous Voltage | | | | | | | X | | |
| Report Voltage Status | | | | | | | X | | |
| Report Temperature | | | | | | X | | | |
| Command Contactor | | X | | | | | | | |
| Command Safe Contactor | | | X | | | | | | |
| Report Safe Contactor State | | | X | | | | | | |
| Manage Test Commands | X | | | | | | | | |
| Manage State Transitions | X | | | | | | | | |
| Manage Discovery | X | | | | | | | | |
| Manage Avatars | X | | | | | | | | |
| Manage Firmware Update | X | | | | | | | | |
| Manage Context | X | | | | | | | | |
| Indicate Comm Port Status | X | | | | | | | | |
| Manage SW/FW Package | X | | | | | | | | |
| Manage Fieldbus | X | | | | | | | | |

FIG. 3

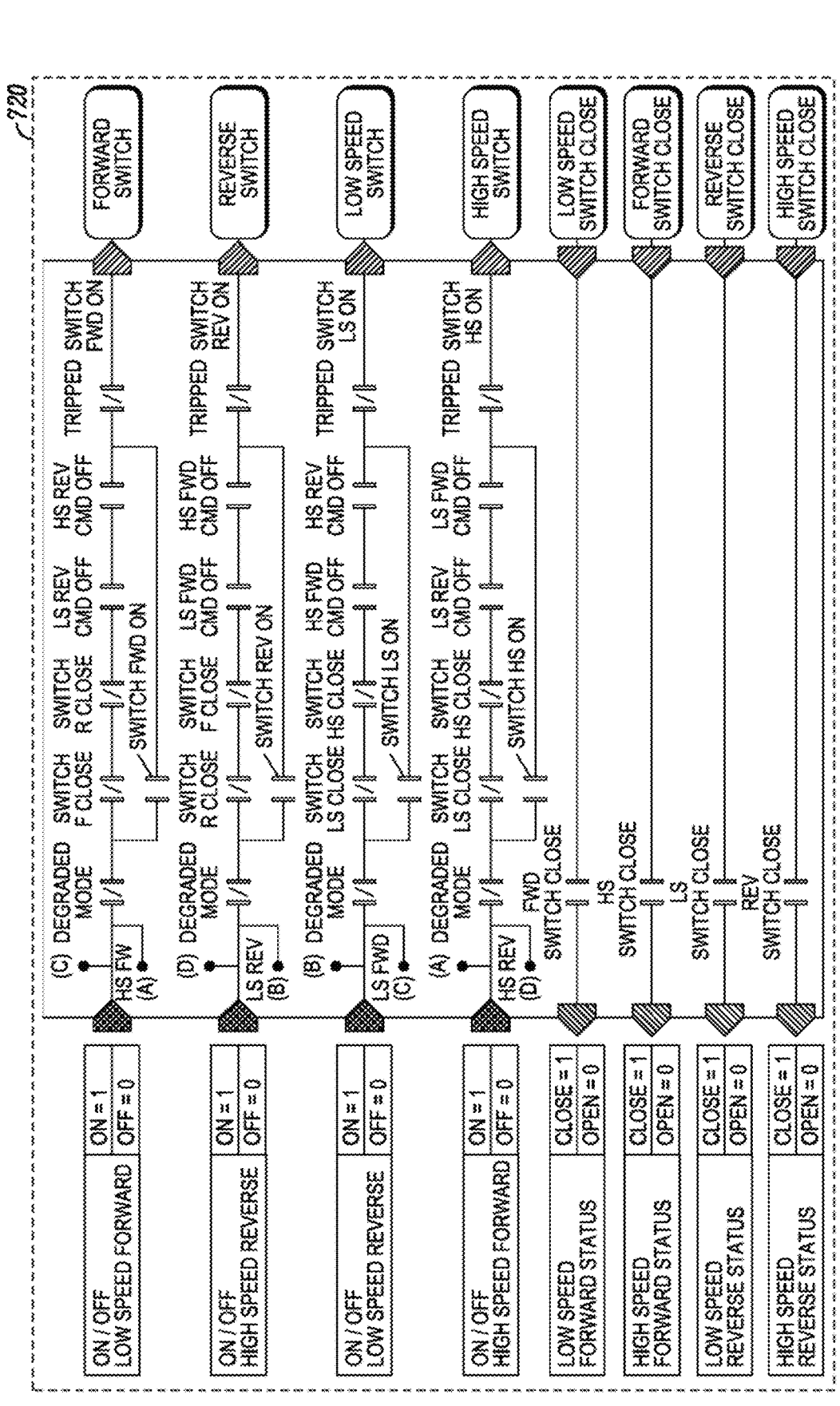
FIG. 7B-A

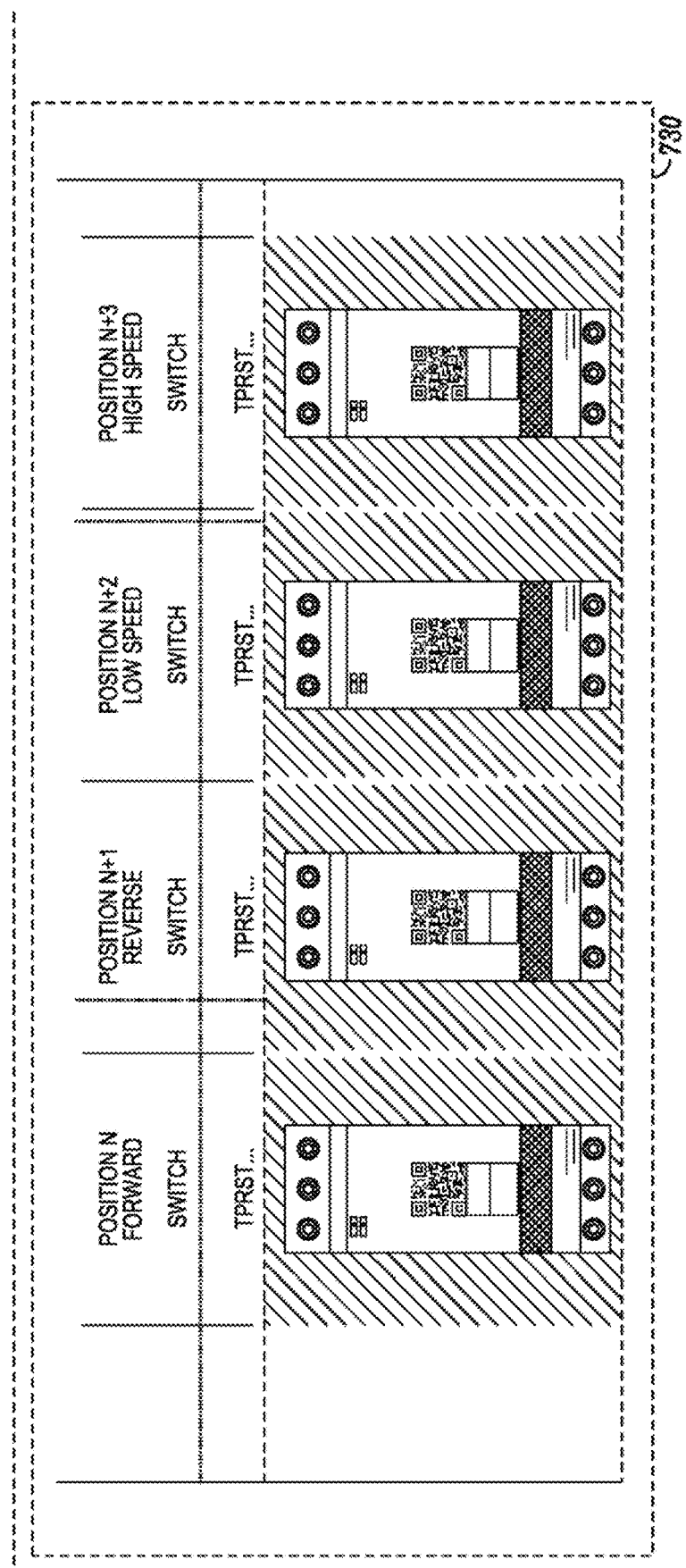
FIG. 7B-B

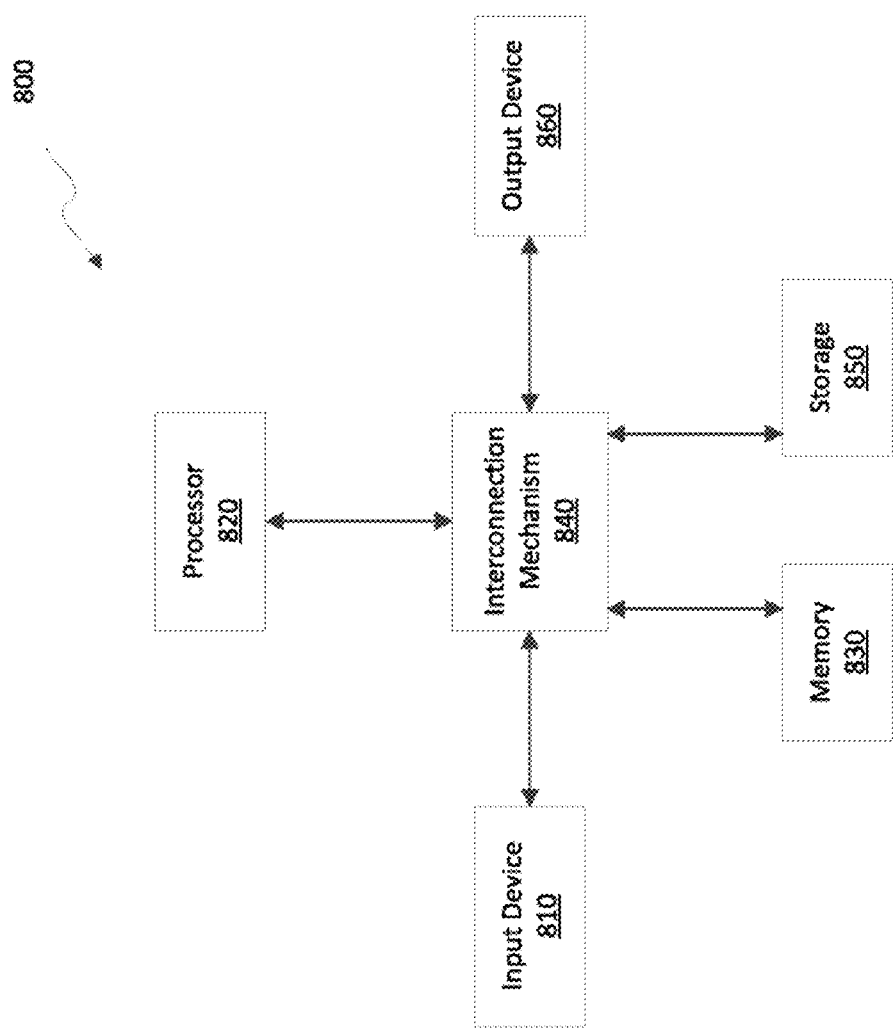

SYSTEMS AND METHODS OF DISTRIBUTED AND DYNAMICALLY CONFIGURABLE MOTOR CONTROL

This international application is based on and claims priority to U.S. Provisional Application Ser. No. 62/758,245, filed Nov. 9, 2018, entitled, SYSTEMS AND METHODS OF DISTRIBUTED AND DYNAMICALLY CONFIGURABLE MOTOR CONTROL, and of which the entire contents is incorporated herein by reference.

TECHNICAL FIELD

The present disclosure relates generally motor control and, more specifically, to systems and techniques for configuring distributed motor control functions.

BACKGROUND

Industry today utilizes the electric motor to perform a wide array of tasks. Generally, various types of motors may be used depending on the particular application. Electric motors may be utilized for fixed speed, variable speed, and/or positional control of various types of industrial equipment. In most industrial applications a motor controller is utilized along with the motor itself to form a motor control system. Motor controllers may include logic and hardware for starting and stopping a motor, selecting the motor rotation, selecting and regulating the speed, regulating or limiting the torque, and/or various protection functions such as overloads and/or faults. Present motor controllers are generally a "one size fits all" approach and contain a monolithic block of motor control functions, many of which remain unused based on the application as one motor controller is designed to be utilized in various applications. Given the wide variability in motor control applications, 01 this monolithic approach to motor control systems presents a serious challenge to providing a scalable and dynamically configurable motor control solution for evolving industrial applications.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 3 illustrates example functions of a system for distributed and dynamically configurable motor control, according to one embodiment described herein.

FIG. 7B, which includes FIGS. 7B-A and 7B-B, illustrates an example of a wye-delta reverser motor topology utilizing a system for distributed and dynamically configurable motor control, according to one embodiment described herein.

FIG. 8 illustrates an example of a starter topology utilizing a system for distributed and dynamically configurable motor control, according to one embodiment described herein.

Identical reference numerals have been used, where possible, to designate identical elements that are common to the figures. However, elements disclosed in one embodiment may be beneficially utilized on other embodiments without specific recitation.

SUMMARY

Figure 1:
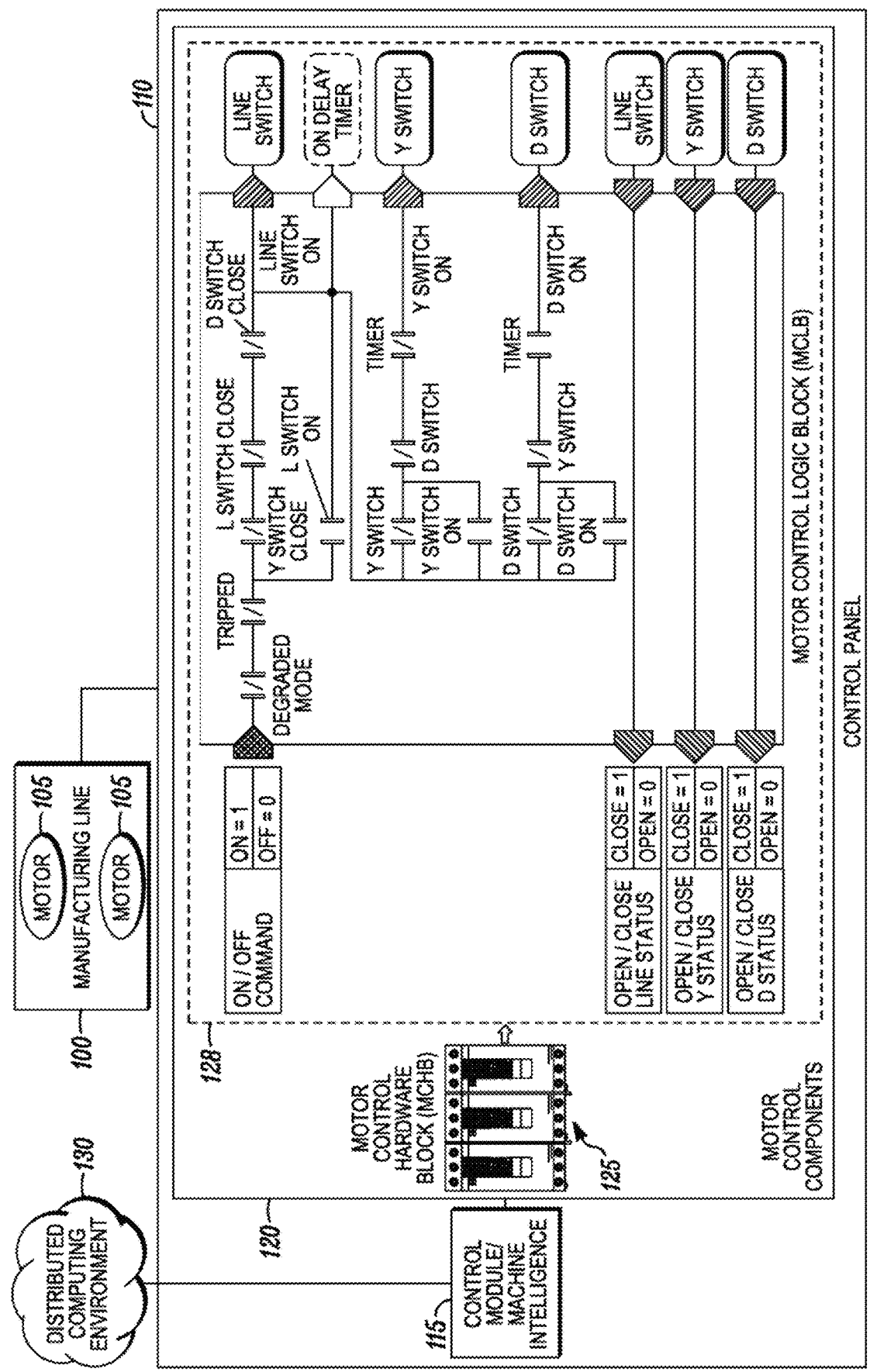
FIG. 1 illustrates an example of an industrial motor control system, according to one embodiment described herein.

One embodiment described herein provides a method that includes receiving a request to implement a first controller for a motor control switch. The method also includes determining a plurality of functional modules for the first controller, wherein each of the plurality of functional modules comprises an instance of computer logic configured to perform a respective function. The method includes determining a respective Motor Control Function Set (MCFS) for performing the respective function of each of the plurality of functional modules. Additionally, the method includes identifying a plurality of configurable hardware blocks that are available for implementing the first controller.

The method also includes allocating one or more of the plurality of configurable hardware blocks to each of the plurality of functional modules, where at least two of the plurality of configurable hardware blocks are allocated to a first one of the plurality of functional modules. The method includes configuring each of the plurality of configurable hardware blocks based on the MCFS of the functional module to which the respective configurable hardware block is allocated, and executing the configured plurality of configurable hardware blocks as a distributed system to control the motor control switch.

Another embodiment described herein provides a system that includes one or more computer processors and a memory containing computer program code that, when executed by operation of the one or more computer processors, performs an operation. The operation includes receiving a request to provide controller functionality for a motor control switch using a distributed controller, wherein the distributed controller comprises a plurality of functional modules, each comprising an instance of computer logic configured to perform a respective function. Additionally, the operation includes identifying a plurality of configurable hardware blocks that are available for implementing the controller functionality. The operation also includes determining a respective configuration for each of a plurality of functional modules to implement a distributed system that provides the controller functionality for the motor control switch. The operation includes configuring each of the plurality of configurable hardware blocks, based on the determined configurations for each of the plurality of functional modules, and executing the configured plurality of configurable hardware blocks as a distributed system to control the motor control switch.

A third embodiment described herein provides a non-transitory computer-readable medium containing computer program code that, when executed by operation of one or more computer processors, performs an operation. The operation includes receiving a request to implement a first controller for a motor control switch. The operation also includes determining a plurality of functional modules for the first controller, where each of the plurality of functional modules comprises an instance of computer logic configured to perform a respective function. The operation includes determining a respective Motor Control Function Set (MCFS) for performing the respective function of each of the plurality of functional modules.

Additionally, the operation includes identifying a plurality of configurable hardware blocks that are available for implementing the first controller and allocating one or more of the plurality of configurable hardware blocks to each of the plurality of functional modules, where at least two of the plurality of configurable hardware blocks are allocated to a first one of the plurality of functional modules. The operation further includes configuring each of the plurality of configurable hardware blocks based on the MCFS of the functional module to which the respective configurable hardware block is allocated. The operation includes executing the configured plurality of configurable hardware blocks as a distributed system to control the motor control switch.

DETAILED DESCRIPTION

Embodiments described herein generally provide systems and techniques for dynamically configuring distributed motor control functions. Conventional motor controllers are generally a "one size fits all" approach and contain a monolithic block of motor control hardware and associated functions many of which remain unused based on the application as one motor controller is designed to be utilized in various applications. Given the wide variability in motor control applications, this monolithic approach to motor control systems presents a serious challenge to providing a scalable and dynamically configurable motor control solution for evolving industrial applications.

As such, embodiments described herein provide hardware blocks that individually may be limited and incapable of performing a complex motor control operation, but can be dynamically configured and controlled to perform a specific task as part of a distributed computing system. These hardware blocks may be combined in a variety of configurations and dynamically configured and controlled to create the appropriate motor control function for the given application. In this way a motor control system may be configured for the application, optimally or otherwise, without an over encompassing motor controller or accompanying hardware to operate a motor control system that does not require application-specific infrastructure.

Increasing the flexibility of a motor control system using a combination of hardware blocks offers varied motor control and protection functions tailorable to a given application. Further, this flexibility may be augmented by the availability of configuring the assembled hardware blocks via a software interface to dynamically configure and control the assembled solution. It should be appreciated that benefits are not achieved merely by programming the hardware, but through the dynamic configuration of a motor control logic scheme.

In this way, individual hardware blocks with the same or similar functions may be used in combination to achieve motor protection and control not possible with other motor control devices. Using this distributed architecture, the combination of hardware blocks may be used to achieve new functions without requiring new application-specific devices with those functions which may be unavailable or over inclusive and cost prohibitive.

A distributed architecture provides several benefits by reducing the specificity of hardware blocks, the number of hardware blocks required to support, facilitate, and/or manage the entire life cycle of an application. This may include, for example, design of equipment, component selection and purchasing, equipment integration, operation, and maintenance.

Further, management of replacement parts is simplified by reducing the number of unique hardware device elements that must be managed and replacing them a reduced number of more simplified hardware blocks. Distributing the functionality of application-specific hardware devices across a number of configurable and more general-purpose devices significantly decreases the cost of the devices through the economy of scale. That is, rather than producing a relatively small number of application-specific hardware for a given task, embodiments enable the production of more general-purpose hardware that can be dynamically configured to work as part of a distributed system for a variety of different tasks. Also, a system may be more easily adapted to changing user needs, as the same devices can be used to accomplish a broad range of functions rather than a specific limited set of functions, enabled by the ability to dynamically configure and control the various devices within the system.

FIG. 1 illustrates an example of an industrial motor control system in accordance with various embodiments of the disclosure. As shown, a manufacturing line 100 includes motors 105(1)-(N) of various types. The various types of motors 105(1)-(N) may include AC, DC motors and may be further broken down by type. Examples include but are not limited to brushless and brushed DC motors, AC squirrel cage, wound rotor motors, servo, and stepper motors. It should be appreciated while other motor types exist, this disclosure contemplates use with all types of motors in a wide array of applications. No limitation regarding the type, number, or application of these motors should be implied.

Generally, the motors 105(1)-(N) could, directly or indirectly, operate equipment related to the function of the manufacturing line 100, in a manner depending on the particular application.

In one embodiment described herein, motor control components 120 include a plurality of configurable hardware blocks 125. In a motor control application, the configurable hardware blocks 125 can be referred to as Motor Control Hardware Blocks. These configurable hardware block 125 may be grouped together to configure various hardware configurations to facilitate and/or execute the required control and/or protections functions for a given application. For example, in some embodiments, it is beneficial for each configurable hardware block 125 to be of a similar internal structure to allow a highly scalable and configurable environment. Such configurable hardware blocks 125 can be configured to perform similar or identical functions, with examples of such functions including, without limitation, starter modules, digital and analog I/O modules, or others as defined by the end user application. Embodiments of the disclosure facilitate a variety of configurable hardware block 125 types and configurations that when configured as a block allow for the defined configuration, control, and protection of the desired motors and desired application.

In the embodiment depicted in FIG. 1, the configurable functionality associated with the configurable hardware block 125 illustrated may be represented logically by a Motor Control Logic Block (MCLB) 128. This logical representation is used to programmatically control the functions of the various configurable hardware block 125 and allow a visualization of combined configurable hardware blocks 125 and their accompanying logical functions. As illustrated, the MCLB 128 includes available inputs, switching functions, and outputs. It is with these various functions the configurable hardware block 125 can be dynamically configured to create scalable motor control and protection schemes. In some implementations, aspects of the schemes may be considered a Distributed Scalable Protection Scheme (DSPS). Embodiments of the disclosure contemplate motor control functions as well as motor protection represented as MCLBs 128.

Motor control components 120 may interact with the distributed system control component 115 which is co-located in a common control panel 110 in the depicted embodiment. Of course, in other embodiments, the distributed system control component 115 can be located in another portion of the manufacturing line 100, building, or even remote in nature, and more generally, the distributed system control component 115 can be located in any environment associated with any sort of automated process (e.g., an automated car wash). A machine intelligence function may be responsible for command and control of the motor control components and serve as the interface between any distributed computing environment 130 such as a remotely located computing environments or other distributed environment. It should be appreciated embodiments of this disclosure need not require a distributed computing environment 130 and all command and control may be accomplished locally as well as remotely.

The distributed system control component 115 may be hardware-based, software-based, or a combination of the two. Further, a machine intelligence function may reside on the edge such as an Internet of Things (IOT) system, locally in a facility with a motor control application, remotely from an application, or in a cloud-based environment. Various embodiments of this disclosure contemplate these various solution forms and environments.

Figure 2:
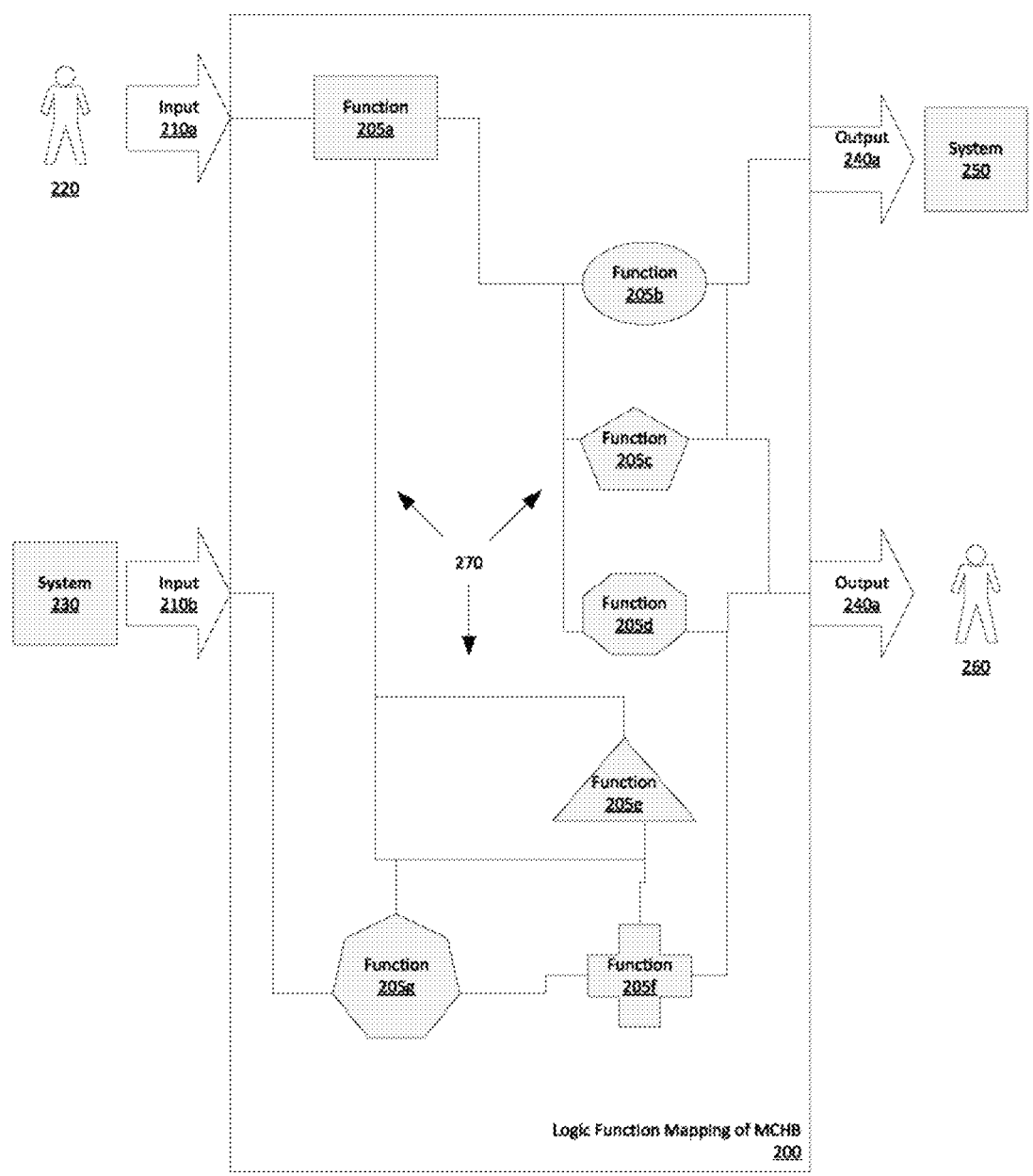
FIG. 2 illustrates an example of logical function mapping of a system for distributed and dynamically configurable motor control, according to one embodiment described herein.

FIG. 2 illustrates an example of logical function mapping of a system for distributed and dynamically configurable motor control in accordance with various embodiments of the disclosure. A key concept to creating a distributed motor control and protection function for a given application is that a single configurable hardware block 125 may be combined with one or more configurable hardware blocks to perform a scalable control and/or protection function for a desired application. This system of configurable hardware blocks may be programmed with a Motor Control Function Set (MCFS) where logic functions are programmed from the distributed system control component 115 to the one or more configurable hardware blocks that form a motor control system. Configuration of the MCFS will determine what motor control and/or protection function the configurable hardware blocks will perform.

In FIG. 2, a configurable hardware block logic function mapping 200 illustrates an example of the various functions 205a-g that may be available for scalable configurations to the distributed system control component 115 using the configurable hardware blocks to accomplish the MCFS functions, where FIG. 3 illustrates some example functions of a configurable hardware block and various examples of configurable hardware block types. Examples of types of configurable hardware blocks may include, bus coupler, starter, safe starter, Power Interface Module (PIM), analog/digital Input/output Module (IOM), Voltage Input Module (VIM), and/or Safety Interface Module (SIM). Examples of functions may include, but are not limited to Command, Configure configurable hardware block (e.g. provide and execute a configuration for a given configurable hardware block), Report MCFS Data (e.g. to report status and information regarding a MCFS), and/or Report configurable hardware block Data (e.g. to report status and information regarding a configurable hardware block). It should be appreciated many other such functions exist and are not limited by this disclosure.

The distributed system control component 115 may process one or more inputs 210a-b from a user 220 and/or various systems 230, and through the logic of the configured MCFS translate these into inputs for the configurable hardware block functions. It should be appreciated a wide number and type of inputs are contemplated including, but not limited to, other configurable hardware block outputs, manual inputs from switches or controls (e.g. a local control switch or operator panel), other controllers, external memory, other devices, external power supplies, and/or external sensors (e.g. over voltage, current, temperature). The distributed system control component 115 may reside on the edge such as an Internet of Things (IOT) system, locally in a facility with a motor control application, remotely from an application, or in a cloud-based environment. Various embodiments of this disclosure contemplate these various solution forms and environments.

The machine intelligence logic functional mapping utilizes these various inputs 200 and interconnected by logical operators 270 that allow interaction of various functions based on the configuration of the MCFS. These functions via their operators create one or more outputs 240a-b that may be used by other configurable hardware blocks, the distributed system control component 115, or other systems and/or management functions. As one of many examples, outputs 240a-b may be utilized to determine health and product identification data, electrical line monitoring, motor status and protection monitoring, motor efficiency data, and/or overall system status. It should be appreciated these are only examples and various embodiments of the disclosure contemplate other various utilization of outputs of the overall system.

Figure 4:
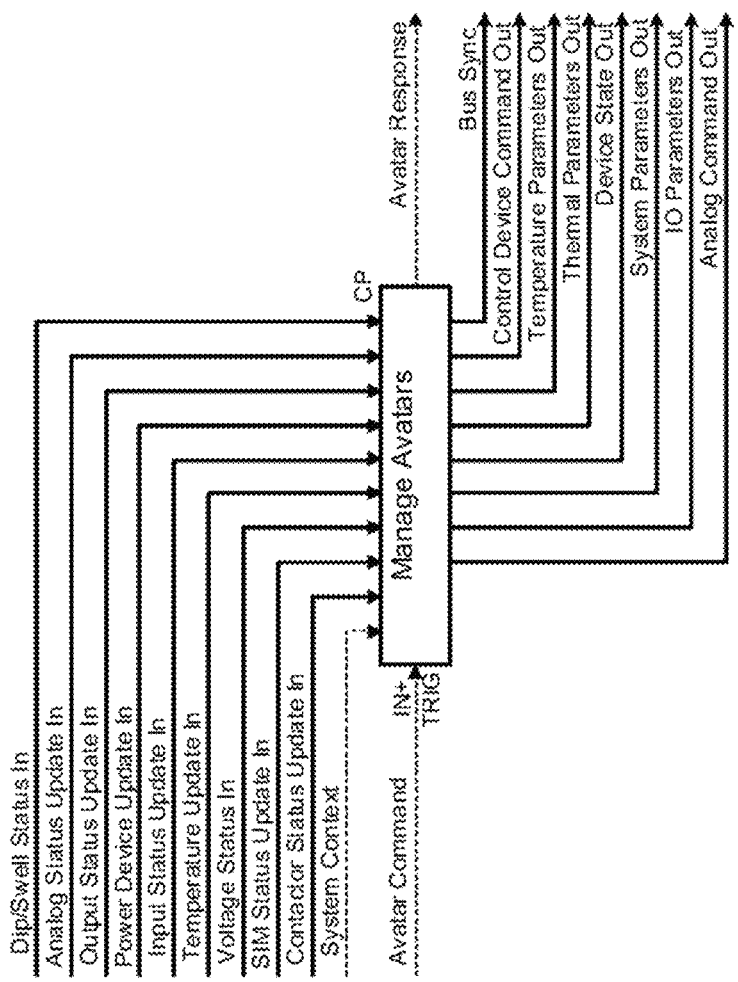
FIG. 4 illustrates an example of a single logical function mapping of a system for distributed and dynamically configurable motor control, according to one embodiment described herein.

FIG. 4 illustrates an example of a single logical function mapping of a configurable hardware block (e.g., configurable hardware blocks 125, shown in FIG. 1) for distributed and dynamically configurable motor control in accordance with various embodiments of the disclosure. Each function will have various inputs and outputs associated with it to allow the function to perform its one or more tasks. It should be appreciated that each of these functions may have the ability to operate independent of any other such functions, be completely dependent on one or more other functions, or a combination of both. In this way, these configurable hardware block functions serve as the building blocks of the MCFS logic function mapping 200. FIG. 2. illustrates the use of various functions 205a-g with the associated inputs and outputs to form a logical block as part of or as a complete solution.

In one embodiment, the distributed system control component 115 is configured to determine which functional modules (also referred to herein as avatars) are configured and which functional modules to provide information. Generally, as used herein, a "functional module" (or "avatar") refers to computer logic (e.g., logic implemented in software and/or hardware) that is dedicated to a particular function or task. For example, a particular functional module could perform the functionality of a direct-on-line reversing starter. In one embodiment, such a functional module is implemented as a distributed system spanning a plurality of configurable hardware blocks 125. Generally, the various functions performed by the plurality of configurable hardware blocks 125 can vary depending on the type of functional module being configured. These functions can include, but are not limited to, read topology, settings, configuration, identification, diagnostics and asset data as needed for that functional module. These functions may also include reading the status of the load protection functions for a functional module and saving the status of the load protection functions for each functional module. If the I/O module is an analog I/O module, as the system transitions into an operational state, environmental parametric messages may be sent to the I/O module in that functional module in accordance with another example function. Other functions may also include transmission of system parameters such as requesting topology, settings, configuration, identification, diagnostics and/or asset data, read that data and return it to the appropriate functional module.

Figure 5:
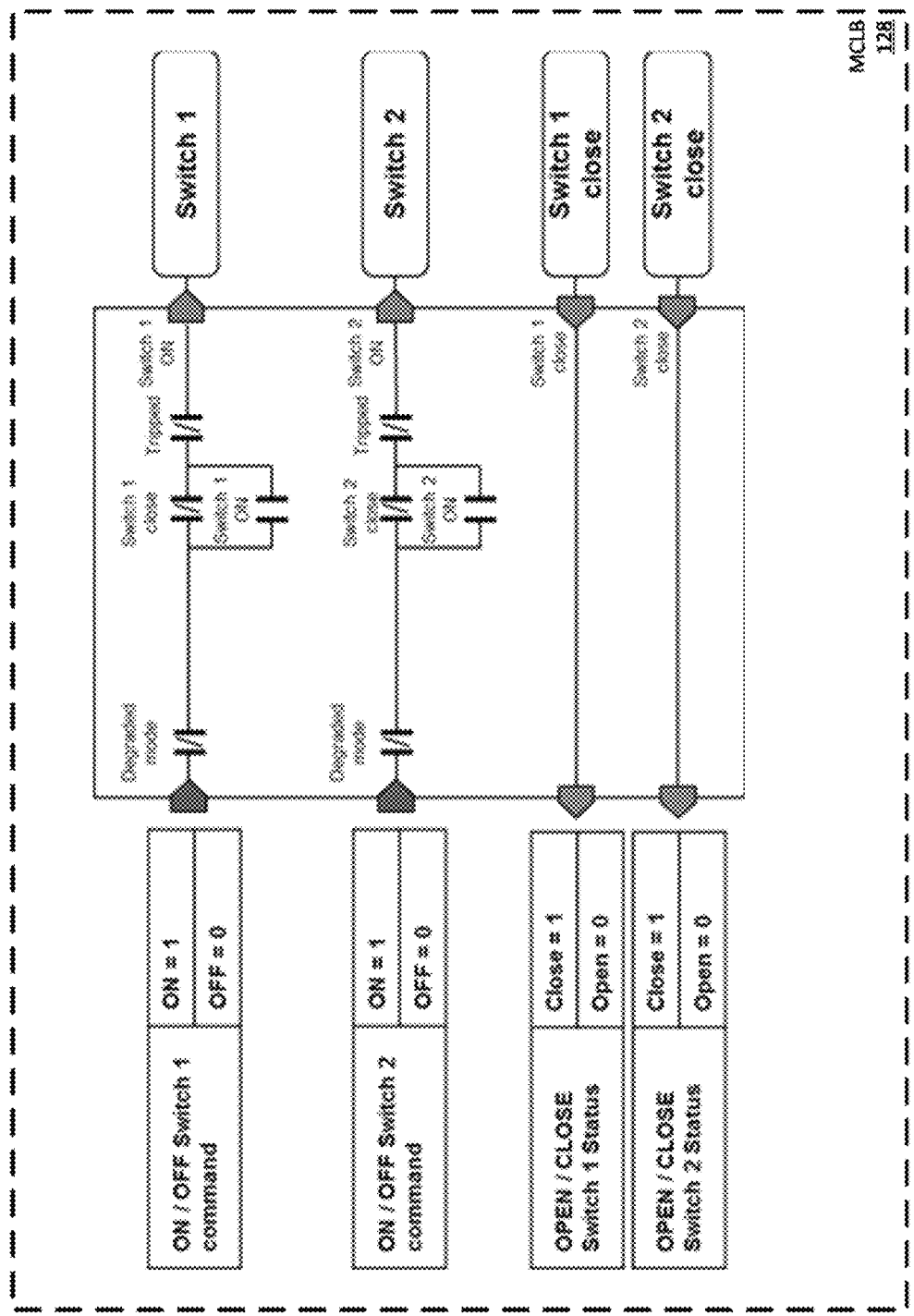
FIG. 5 illustrates an example of a control logic representation of a single logical function mapping of a system for distributed and dynamically configurable motor control, according to one embodiment described herein.

FIG. 5 illustrates an example of a control logic diagram MCLB 128 for a single MCFS of a system for distributed and dynamically configurable motor control in accordance with various embodiments of the disclosure. A configurable hardware block is a unit of hardware that is controlled by being programmed, configured, and/or controlled by the distributed system control component 115 according to the configured MCFS functions. As described in FIG. 4 the MCFS includes a series of logical functions, a configurable hardware block representation of how the logic of the MCFS is implemented on the hardware of the configurable hardware block. Each unique MCFS will utilize a specific hardware configuration on a configurable hardware block. It should be appreciated that each configurable hardware block will receive the same MCFS, a unique portion of the total MCFS, or none of the MCFS as determined by the application. Embodiments of the disclosure also contemplate the redundant nature of a solution where multiple configurable hardware blocks may serve as redundant components in the event of a failure. Others may contain no (or substantially no) portion of the MCFS and be deployed in a spare capacity as needed once appropriately loaded with an MCFS. As such the hardware of each of the configurable hardware block will be changed to meet the corresponding MCFS.

Figure 6A:
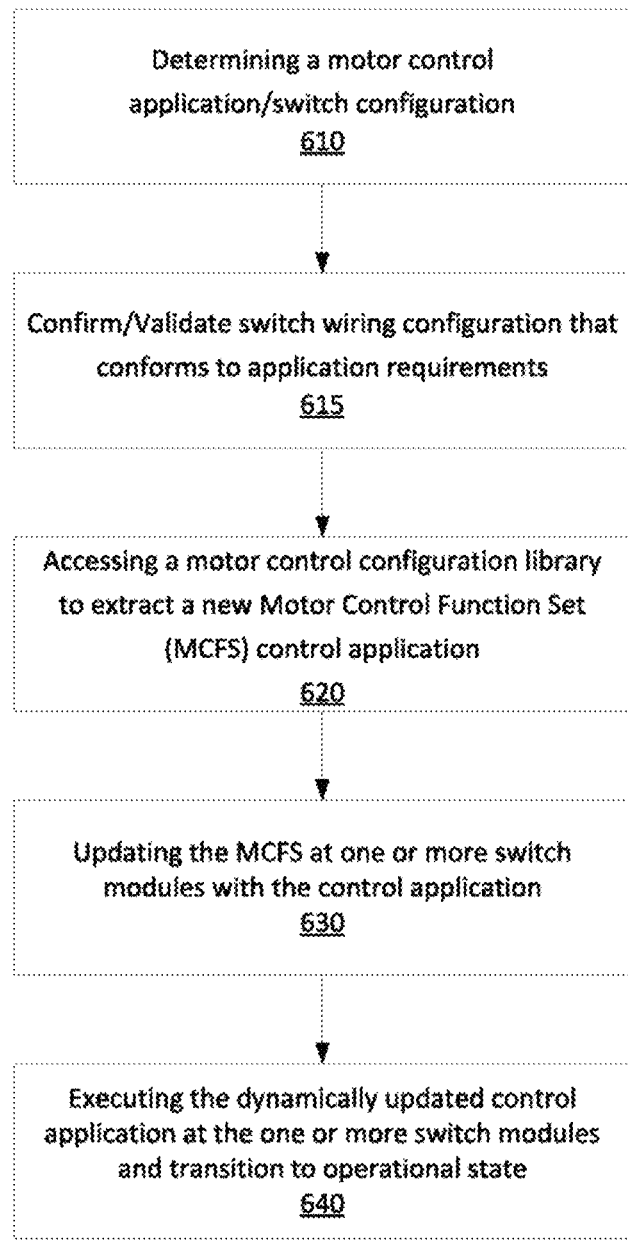
FIG. 6A is a flow diagram illustrating a method for distributed and dynamically configurable motor control, according to one embodiment described herein.

FIG. 6A illustrates an example flow diagram of a method for distributed and dynamically configurable motor control in accordance with various embodiments of the disclosure. In one embodiment a user or system determines a motor control application/switch configuration 610. This determination may be performed manually as when a user selects a particular motor control configuration or parameters regarding an application that are utilized to create a MCFS. A determination may also be made by a system automatically based on input to other parts of the system or automatic discovery of associated devices. For example, if the distributed system control component 115 scans the available motor hardware, via an established protocol, and determines that a particular configuration is available, a system may determine an appropriate motor control configuration to match. In some embodiments a selection of a MCFS will determine the particular motor control switch configuration. This may occur in a separate operation distinct from the operation of the reminder of the process. During selection, a user or system may select the desired MCFS which will determine the particular configurable hardware blocks required for the particular application.

A confirmation/validation of the MCFS solution is performed to assure the proposed solution matches the application to be configured 615. A motor control library function is accessed to extract an appropriate MCFS 620. This MCFS is a digital representation of a set of logical functions which will determine what configurable hardware blocks are needed and how the configurable hardware blocks and the distributed system control component 115 will operate to achieve the desired MCFS behavior. This behavior may include but is not limited to management, control, and/or protection. A MCFS may reside in the distributed system control component 115, a distributed computing environment 130, or other general-purpose computer either locally or remotely to the manufacturing line 100. Embodiments of the disclosure contemplate these functions (610, 615, and/or 620) may be performed in one or more operations and produce a unified, validated, MCFS output to be further processed by the system.

Once the appropriate MCFS is derived to configure the determined configurable hardware blocks, the MCFS will be updated at the one or more configurable hardware blocks with the determined MCFS 630. A MCFS will be communicated via a communications protocol and loaded to each configurable hardware block. Examples the communications may include CAN, TCP/IP, and/or other industry standard protocols. It should be appreciated that each configurable hardware block may receive the same MCFS, a unique portion of the total MCFS, or none of the MCFS as determined by the application.

Embodiments of the disclosure also contemplate the redundant nature of a solution where multiple configurable hardware blocks may serve as redundant components in the event of a failure. Others may contain no portion of the MCFS and be deployed in a spare capacity as needed once appropriately loaded with an MCFS.

Once dynamically updated with the appropriate MCFS, the one or more configurable hardware block will execute the MCFS 640 and enter an operational state. This state may include validation of the loading of the MCFS and/or communication with the other configurable hardware block in the solution to determine readiness of the complete MCFS functionality solution in addition to readiness of each configurable hardware block. When executed the MCFS may provide a periodic check to assure the MCFS is operating properly such as a heartbeat or other mechanism to validate end to end operation of the solution as illustrated in FIGS. 6B and 6C.

Figure 6B:
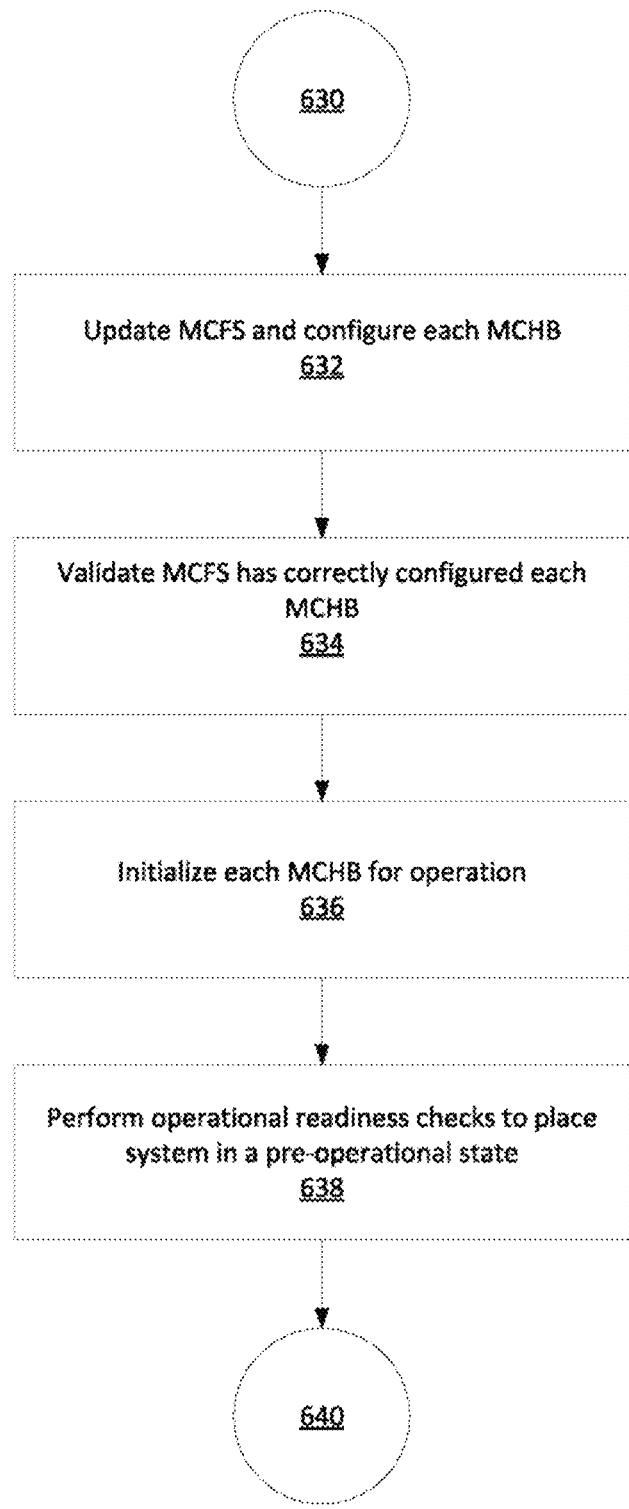
FIG. 6B is a flow diagram illustrating assembly of a method for distributed and dynamically configurable motor control, according to one embodiment described herein.

FIG. 6B illustrates an example flow diagram of assembling a method for distributed and dynamically configurable motor control in accordance with various embodiments of the disclosure. As illustrated previously, once the appropriate MCFS is derived to configure the determined configurable hardware blocks, the MCFS will be updated at the one or more configurable hardware blocks with the determined MCFS 630. Each configurable hardware block will be dynamically updated based on the MCFS 632. It should be appreciated that each configurable hardware block may receive the same MCFS, a unique portion of the total MCFS, or none of the MCFS as determined by the application.

A validation will occur that the complete MCFS has correctly configured the appropriate configurable hardware blocks and each configurable hardware block will be initialized for operation 636. This initialization may include various internal validations to assure the configurable hardware block has been configured correctly and is ready to be placed in a pre-operational state. On completion of an initialization of each configurable hardware block in a solution, final operational readiness checks will be performed 638 that may include intra-configurable hardware block communication, communication to the remained of the application elements, and/or communication between the respective elements of the solution and any local, remote, or distributed processing capabilities. If successful, the application will be placed from an operational readiness state to an operational state.

Figure 6C:
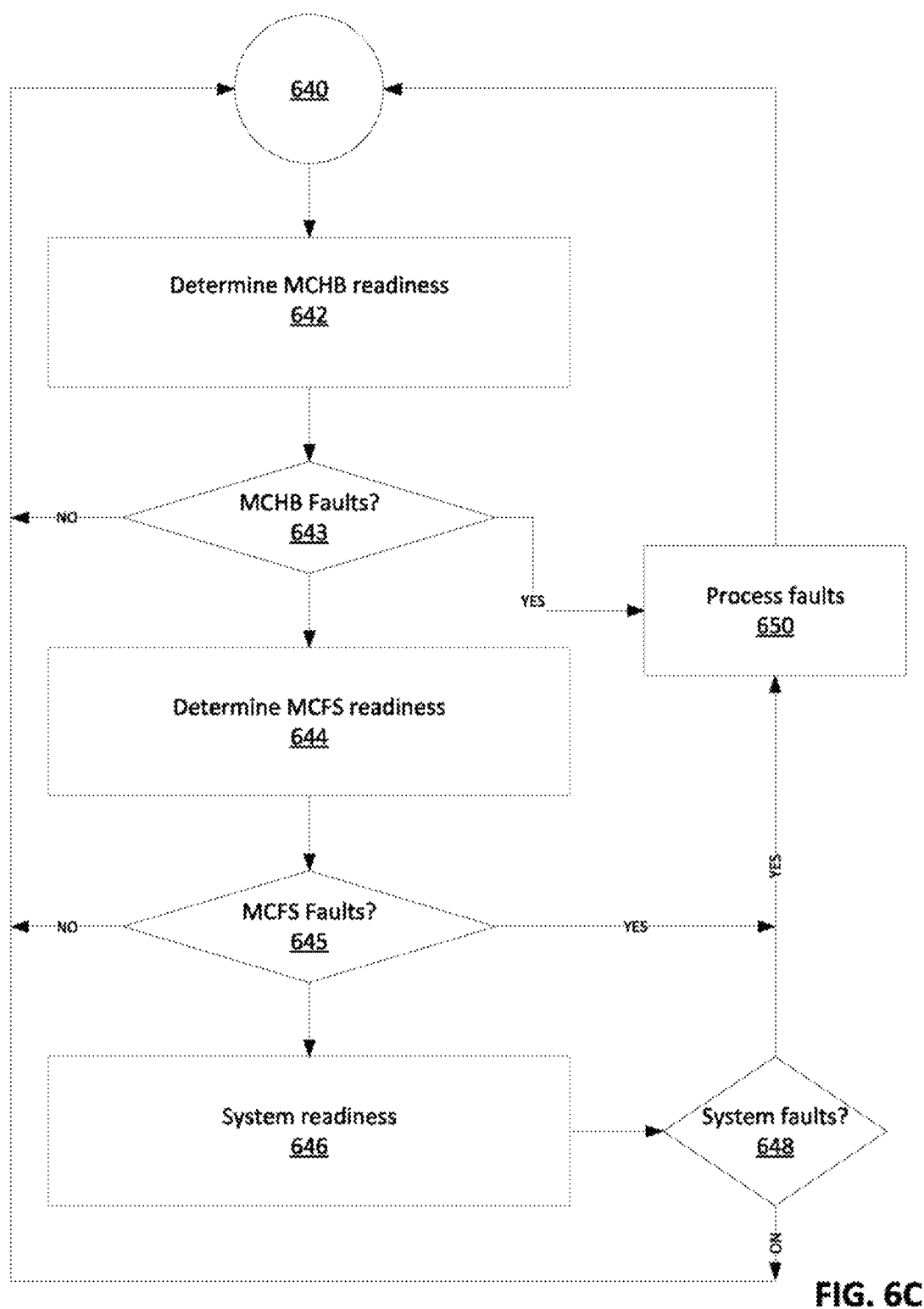
FIG. 6C is a flow diagram illustrating execution of a method for distributed and dynamically configurable motor control, according to one embodiment described herein.

FIG. 6C illustrates an example flow diagram of execution of a method for distributed and dynamically configurable motor control in accordance with various embodiments of the disclosure. Once dynamically updated with the appropriate MCFS, the one or more configurable hardware block will execute the MCFS 640 and enter an operational state. Once in an operation state, the system will communicate health, status, and/or faults to various portions of the system without regard to their physical location. Examples of health, status and/or faults may include, but are not limited to, go/no-go status, environmental conditions such as temperature, operational conditions such as voltage, fault conditions such as over current. Embodiments of this disclosure contemplate the utilization of the wide variety of these parametric as information to be utilized by the system to determine and perform such actions in furtherance of the benefits of the disclosure.

Elements of the system such as the configurable hardware blocks, MCFSs, and overall system will be monitored for readiness 642 644 646 respectively. This monitoring may occur in real time, near real time, periodically, on demand, or at any other interval. Monitoring of the various readiness may include health, status, and/or faults. This information may be utilized to communicate to other parts of the system, to a management system, or other function to effectuate communication, monitoring, and/or management of the overall system. configurable hardware blocks, MCFSs, and overall system will also be monitored for faults or other behavior determined anomalous with regard to the given application 643 645 646 respectively. Each fault and/or anomaly will be processed 650 and remediated accordingly. Processing and remediation may include a wide range of actions including, but not limited to, reporting health, status, and/or faults to a management system for further actions. Autonomous action is also contemplated as part of this disclosure in various embodiments where the system may act to remedy the faults determined to be occurring.

Figure 7A:
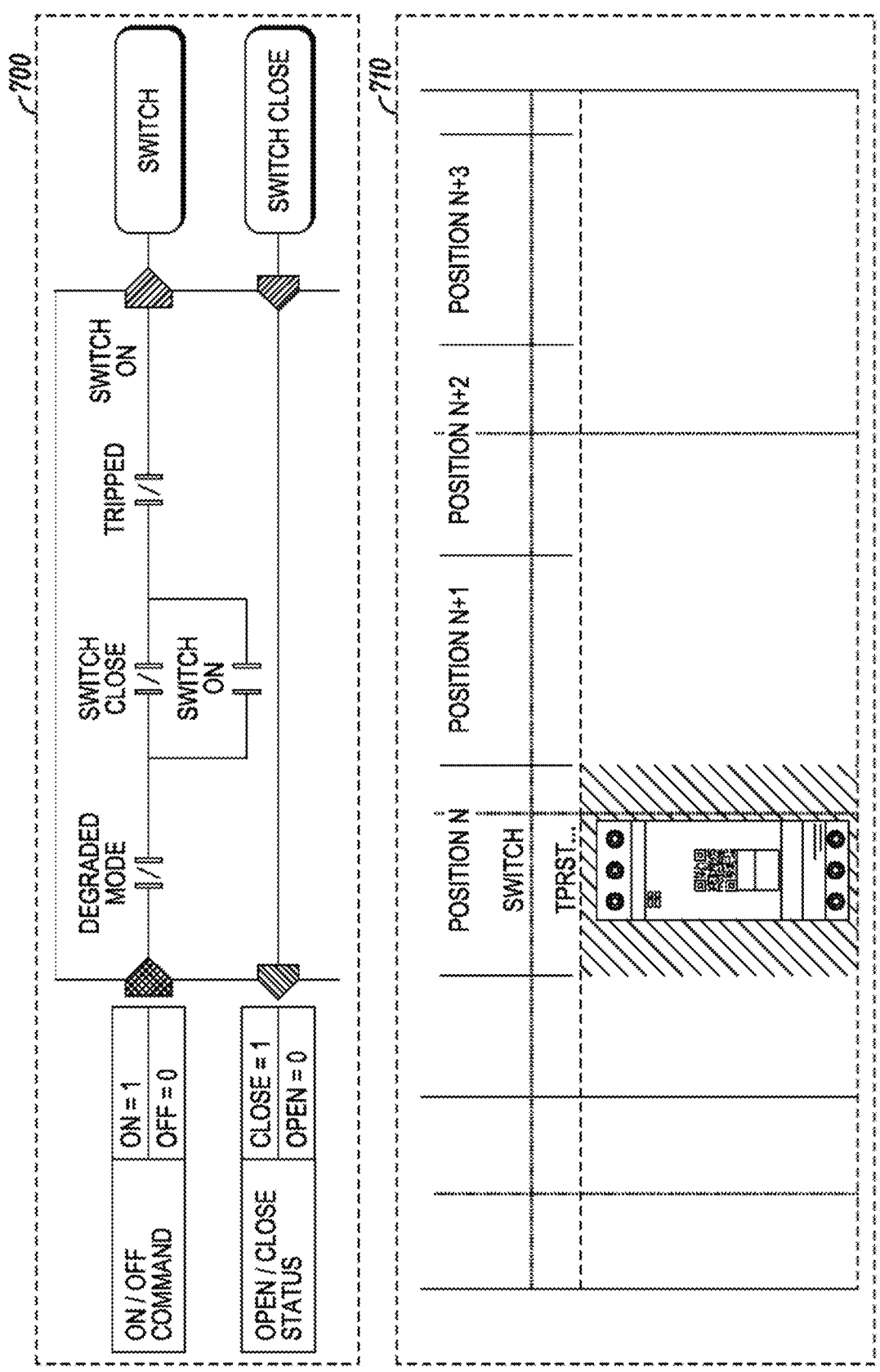
FIG. 7A illustrates an example of a starter motor topology utilizing a system for distributed and dynamically configurable motor control, according to one embodiment described herein.

FIG. 7A illustrates an example of a starter motor topology utilizing a system for distributed and dynamically configurable motor control in accordance with various embodiments of the disclosure. In this case a MCFS of a motor starter is implemented utilizing a single configurable hardware block. A starter motor MCLB 700 is illustrated as a result of an associated MCFS. Such a MCFS would yield a starter motor configurable hardware block configuration 710. A magnetic motor starter is found in nearly all motor control applications and generally is an electro-mechanical device that starts and stops a connected motor load. Most motor starters consist of an electrical contactor and an overload relay which provides protection in case of an electrical event related to the motor such as a motor overload.

A starter motor control switch configuration is determined to be used in a particular application. Based on this application a MCFS of a motor starter is determined by a user or a system and available at the distributed system control component 115 either locally or remotely from a distributed computing environment 130. A starter motor control MCFS is programmed to the configurable hardware block as indicated in FIG. 7A. Once the MCFS is updated at the configurable hardware block and reports ready, the MCFS is executed and the configurable hardware block is then configured to be a starter motor control switch. Other connections to the circuit may now be installed or activated and the circuit operated as designed.

It should be appreciated that while the motor control logic may be less complex than many motor control or protection functions, the control or protection is achieved using the same configurable hardware block devices as more complex MCFS configurations and applications. Additionally, the concept of scaling a solution may be illustrated in this example, as while only one configurable hardware block is utilized, if a non-distributed or scalable solution was implemented, far more hardware resources may have been required that may have never been utilized. In sum, a benefit of this disclose is realized where less complex functions, require less hardware. Implementing this solution without the benefits of this disclosure may create a far more complex hardware solution.

FIG. 7B illustrates an example of a reversing two speed topology utilizing a system for distributed and dynamically configurable motor control in accordance with various embodiments of the disclosure. In this case, a MCFS of a two-speed reverser is implemented utilizing four configurable hardware blocks. A two-speed reverser MCLB 720 is illustrated as a result of an associated MCFS. Such a MCFS would yield a two-speed reverser configurable hardware block configuration 730. A two-speed connection is used to control two speed motors, which is one way of achieving motor speed control for applications such as hoisting, milling and pumping.

A two-speed reverser motor control switch configuration is determined to be used in a particular application. Based on this application a MCFS of a wye-delta reverser motor controller is determined by a user or a system and available at the distributed system control component 115 either locally or remotely from a distributed computing environment 130. A two-speed reverser motor control MCFS is programmed to the configurable hardware block as indicated in FIG. 7B. Once the MCFS is updated at the multiple configurable hardware block and each report ready, the MCFS is executed and the configurable hardware block solution is then configured to be a two-speed reverser motor control switch. Other connections to the circuit may now be installed or activated and the circuit operated as designed. FIG. 7B illustrates the benefit of the flexibility of the distributed architecture as 4 individual configurable hardware block devices, which are similar to one another are utilized.

When complete, a system transitions from an operational ready state to an operational state. In an operational state, a system will perform control and protection functions for a motor control application based on the configuration from a MCFS. It is to be appreciated that a benefit of an operational system includes collection and transmission of operational characteristics of the motor control application. This may include the capture and transmission of parametric associated with the application including, motor efficiency, electrical usage, and faults associated with elements of the application. This data may be transmitted to portions of the system for further analysis or actions. This includes transmission to the distributed computing environment 130 where the information may be analyzed and utilized in various big data or IOT applications.

Any general-purpose computer systems used in various embodiments of this disclosure may be, for example, general-purpose computers such as those based on Intel PENTIUM-type processor, Motorola PowerPC, Sun UltraSPARC, Hewlett-Packard PA-RISC processors, ARM, or any other type of processor.

For example, various embodiments of the disclosure may be implemented as specialized software executing in a general-purpose computer system 800 such as that shown in FIG. 8. The computer system 800 may include a processor 820 connected to one or more memory devices 830, such as a disk drive, memory, or other device for storing data. Memory 830 is typically used for storing programs and data during operation of the computer system 800. The computer system 800 may also include a storage system 850 that provides additional storage capacity. Components of computer system 800 may be coupled by an interconnection mechanism 840, which may include one or more busses (e.g., between components that are integrated within the same machine) and/or a network (e.g., between components that reside on separate discrete machines). The interconnection mechanism 840 enables communications (e.g., data, instructions) to be exchanged between system components of system 800.

Computer system 800 also includes one or more input devices 810, for example, a keyboard, mouse, trackball, microphone, touch screen, and one or more output devices 860, for example, a printing device, display screen, speaker. In addition, computer system 800 may contain one or more interfaces (not shown) that connect computer system 800 to a communication network (in addition or as an alternative to the interconnection mechanism 840).

Figure 9:
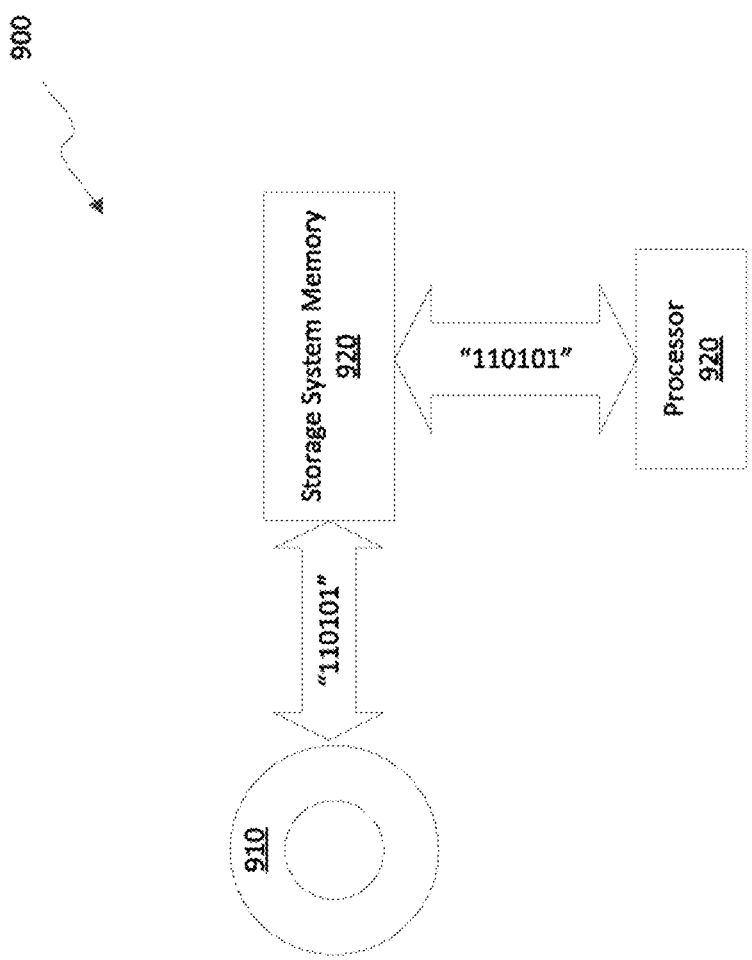
FIG. 9 is a functional block diagram of a general-purpose storage system for use in implementing various embodiments described herein.

The storage system 850, shown in greater detail in FIG. 9, typically includes a computer readable and writeable nonvolatile recording medium 910 in which signals are stored that define a program to be executed by the processor or information stored on or in the medium 910 to be processed by the program to perform one or more functions associated with embodiments described herein. The medium may, for example, be a disk or flash memory. Typically, in operation, the processor causes data to be read from the nonvolatile recording medium 910 into another memory 920 that allows for faster access to the information by the processor than does the medium 910. This memory 920 is typically a volatile, random access memory such as a Dynamic Random-Access Memory (DRAM) or Static RAM (SRAM). It may be located in storage system 900, as shown, or in memory system 830. The processor 820 generally manipulates the data within the integrated circuit memory 830, 920 and then copies the data to the medium 910 after processing is completed. A variety of mechanisms are known for managing data movement between the medium 910 and the integrated circuit memory element 830, 920, and the disclosure is not limited thereto. The disclosure is not limited to a particular memory system 830 or storage system 850.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 800 is shown by way of example as one type of computer system upon which various aspects of the disclosure may be practiced, it should be appreciated that aspects of the disclosure are not limited to being implemented on the computer system as shown in FIG. 9. Various aspects of the disclosure may be practiced on one or more computers having a different architecture or components shown in FIG. 9. Further, where functions or processes of embodiments of the disclosure are described herein (or in the claims) as being performed on a processor or controller, such description is intended to include systems that use more than one processor or controller to perform the functions.

Computer system 800 may be a general-purpose computer system that is programmable using a high-level computer programming language. Computer system 800 may be also implemented using specially programmed, special purpose hardware. In computer system 800, processor 820 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 7, Windows 10, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Figure 10:
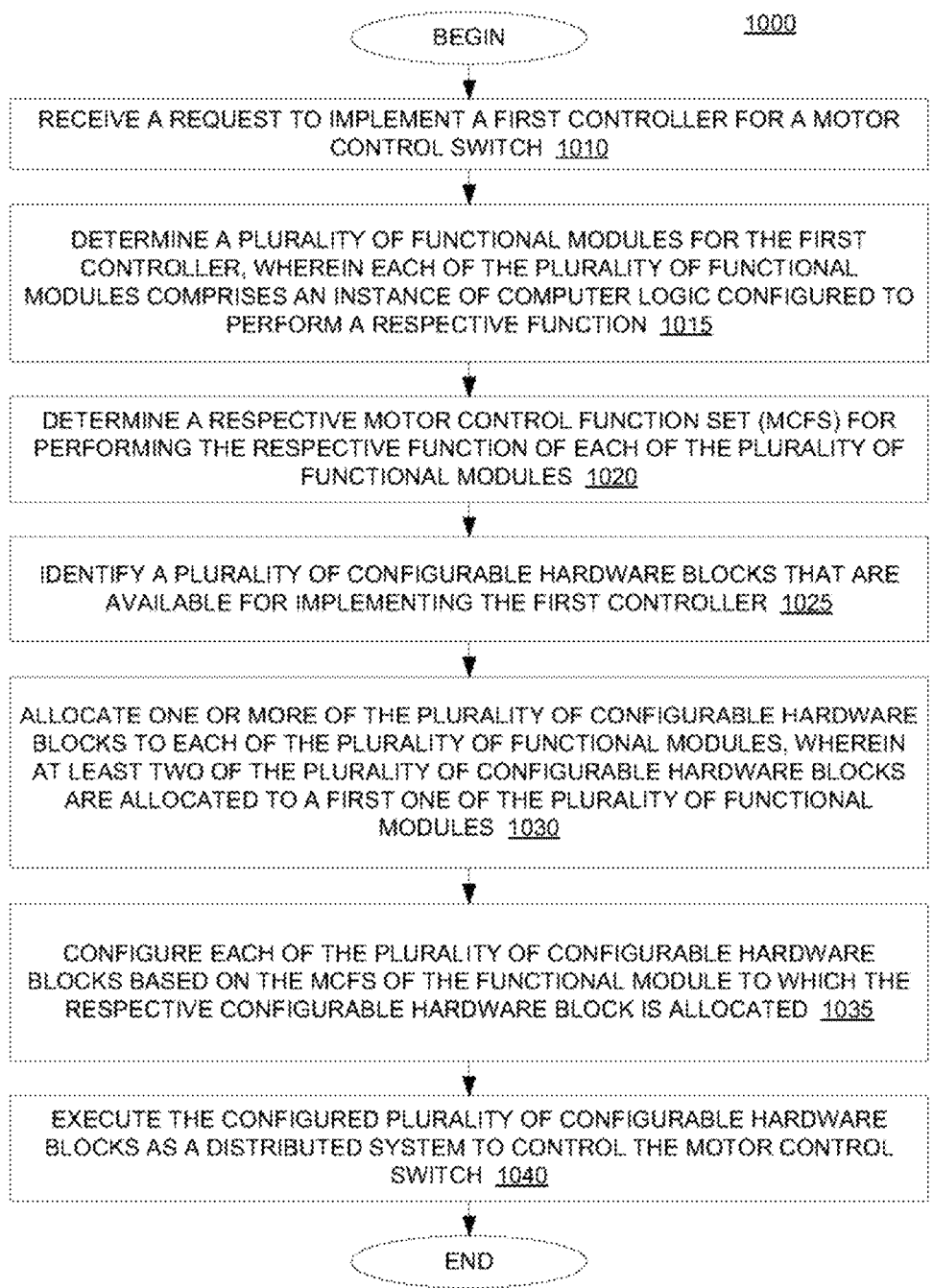
FIG. 10 is a flow diagram illustrating a method for configuring and executing a distributed system for controlling a motor control switch, according to one embodiment described herein.

FIG. 10 is a flow diagram illustrating a method for configuring and executing a distributed system for controlling a motor control switch, according to one embodiment described herein. As shown, the method 1000 begins at block 1010, where the control module 115 receives a request to implement a first controller for a motor control switch. The control module 115 determines a plurality of functional modules for the first controller, where each of the plurality of functional modules comprises an instance of computer logic configured to perform a respective function (block 1015). Additionally, the control module 115 determines a respect MCFS for performing the respective function of each of the plurality of functional modules (block 1020).

The control module 115 further identifies a plurality of configurable hardware blocks that are available for implementing the first controller (block 1025). The control module 115 allocates one or more of the plurality of configurable hardware blocks to each of the plurality of functional modules, wherein at least two of the plurality of configurable hardware blocks are allocated to a first one of the plurality of functional modules (block 1030). The control module 115 also configures each of the plurality of configurable hardware blocks based on the MCFS of the functional module to which the respective configurable hardware block is allocated (block 1035). The control module 115 executes the configured plurality of configurable hardware blocks as a distributed system to control the motor control switch (block 1040), and the method 1000 ends.

Figure 11:
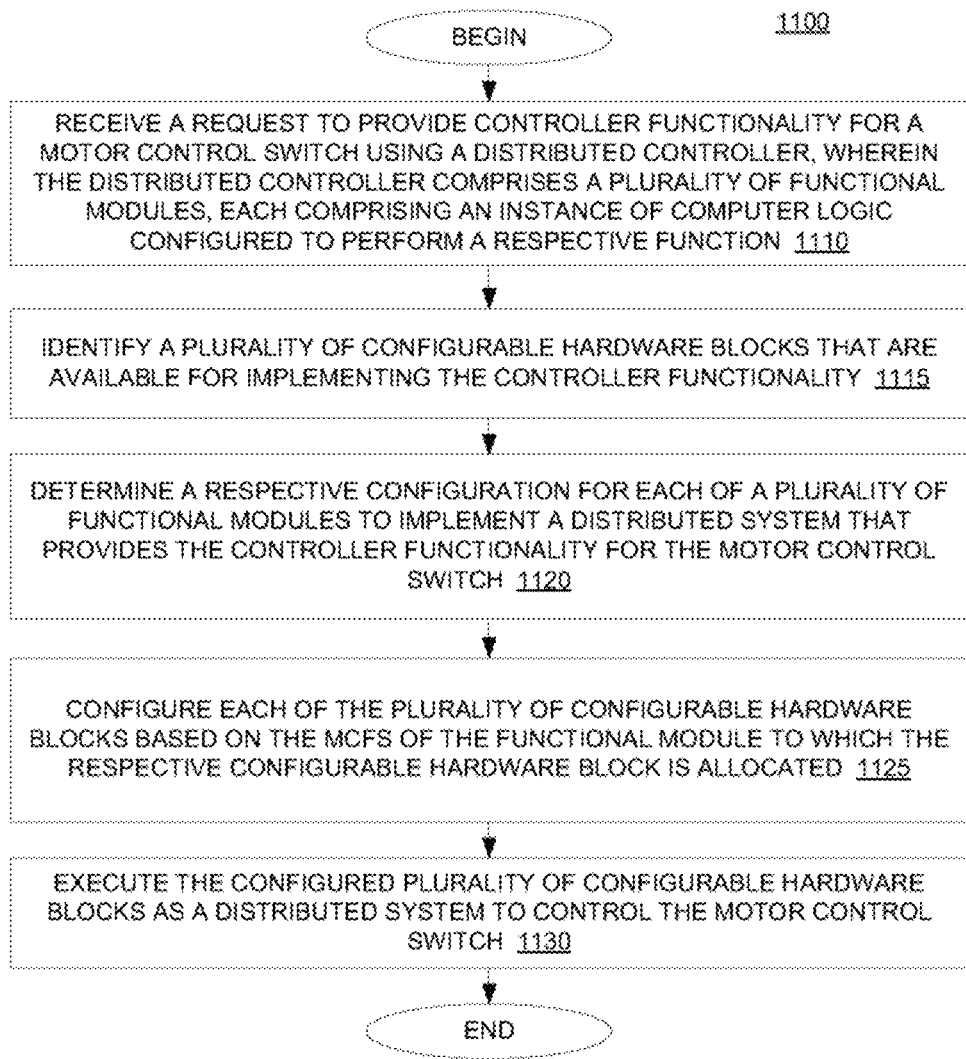
FIG. 11 is a flow diagram illustrating another method for configuring and executing a distributed system for controlling a motor control switch, according to one embodiment described herein.

FIG. 11 is a flow diagram illustrating another method for configuring and executing a distributed system for controlling a motor control switch, according to one embodiment described herein. The method 1100 begins at block 1110, where the control module 115 receives a request to provide controller functionality for a motor control switch using a distributed controller. In the depicted embodiment, the distributed controller comprises a plurality of functional modules, each comprising an instance of computer logic configured to perform a respective function. The control module 115 identifies a plurality of configurable hardware blocks that are available for implementing the controller functionality (block 1115).

Additionally, the control module 115 determines a respective configuration for each of a plurality of functional modules to implement a distributed system that provides the controller functionality for the motor control switch (block 1120). The control module 115 configures each of the plurality of configurable hardware blocks, based on the determined configurations for each of the plurality of functional modules (block 1125). The control module 115 further executes the configured plurality of configurable hardware blocks as a distributed system to control the motor control switch (block 1130), and the method 1100 ends.

Figure 12:
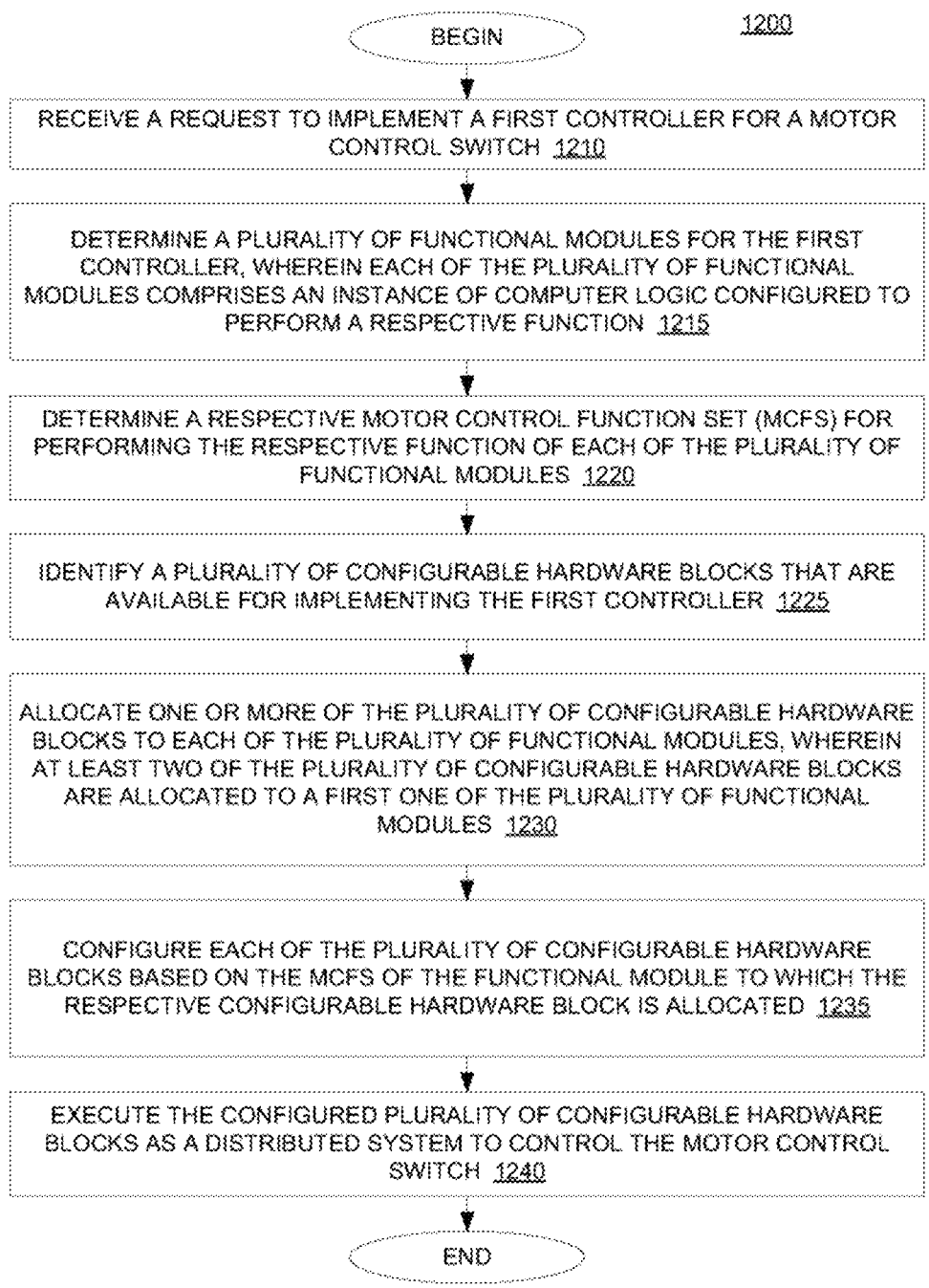
FIG. 12 is a flow diagram illustrating another method for configuring and executing a distributed system for controlling a motor control switch, according to one embodiment described herein.

FIG. 12 is a flow diagram illustrating another method for configuring and executing a distributed system for controlling a motor control switch, according to one embodiment described herein. As shown, the method 1200 begins at block 1210, where the control module 115 receives a request to implement a first controller for a motor control switch. The control module 115 determines a plurality of functional modules for the first controller, where each of the plurality of functional modules comprises an instance of computer logic configured to perform a respective function (block 1215). Additionally, the control module 115 determines a respective MCFS for performing the respective function of each of the plurality of functional modules (block 1220).

The control module 115 further identifies a plurality of configurable hardware blocks that are available for implementing the first controller (block 1225). The control module 115 allocates one or more of the plurality of configurable hardware blocks to each of the plurality of functional modules, where at least two of the plurality of configurable hardware blocks are allocated to a first one of the plurality of functional modules (block 1230). The control module 115 also configures each of the plurality of configurable hardware blocks based on the MCFS of the functional module to which the respective configurable hardware block is allocated (block 1235). The control module 115 executes the configured plurality of configurable hardware blocks as a distributed system to control the motor control switch (block 1240), and the method 1200 ends.

Various embodiments of the present disclosure may be programmed using an object-oriented programming language, such as SmallTalk, Java, C++, Ada, or C # (C-Sharp). Other object-oriented programming languages may also be used. Alternatively, functional, scripting, and/or logical programming languages may be used, such as BASIC, ForTran, COBoL, TCL, or Lua. Various aspects of the disclosure may be implemented in a non-programmed environment (e.g., documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

Embodiments of a systems and methods described above are generally described for use in relatively large data centers having numerous equipment racks; however, embodiments of the disclosure may also be used with smaller data centers and with facilities other than data centers. Some embodiments may also be a very small number of computers distributed geographically so as to not resemble a particular architecture.

In embodiments of the present disclosure discussed above, results of analyses are described as being provided in real-time. As understood by those skilled in the art, the use of the term real-time is not meant to suggest that the results are available immediately, but rather, are available quickly giving a designer the ability to try a number of different designs over a short period of time, such as a matter of minutes.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

This disclosure is not limited in its application to the details of construction and the arrangement of components set forth in the preceding descriptions or illustrated by the drawings. The disclosure is capable of other embodiments and of being practiced or of being carried out in various ways. Also, the phraseology and terminology used herein is for description purposes and should not be regarded as limiting. The use of "including," "comprising," "having," "containing," "involving," and variations herein, are meant to be open-ended, i.e. "including but not limited to."

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method, comprising:
receiving a request to implement a first controller for a motor control switch for an industrial application;
determining a plurality of functional modules for the first controller, wherein each of the plurality of functional modules comprises an instance of computer logic configured to perform a respective function;
determining a respective Motor Control Function Set (MCFS) for performing the respective function of each of the plurality of functional modules;
identifying a plurality of configurable hardware blocks that are available for implementing the first controller, wherein the plurality of configurable hardware blocks include at least one of a bus coupler module, a starter module, a safe starter module, a Power Interface Module (PIM), an analog/digital Input/output Module (IOM), Voltage Input Module (VIM), and a Safety Interface Module (SIM);

allocating one or more of the plurality of configurable hardware blocks to each of the plurality of functional modules, wherein at least two of the plurality of configurable hardware blocks are allocated to a first one of the plurality of functional modules;

configuring each of the plurality of configurable hardware blocks based on the MCFS of the functional module to which the respective configurable hardware block is allocated; and executing the configured plurality of configurable hardware blocks as a distributed system to control the motor control switch for the industrial application, wherein allocating one or more of the plurality of configurable hardware blocks to each of the plurality of functional modules further comprises:

determining two or more potential allocations of configurable hardware blocks from the plurality of configurable hardware blocks to a first functional module of the plurality of functional modules, wherein a different number of configurable hardware blocks are allocated to the first functional module in at least two of the two or more potential allocations; and selecting one of the two or more potential allocations.

2. The method of claim 1, wherein the plurality of configurable hardware blocks each comprise a plurality of inputs, a plurality of outputs and one or more processing functions for processing input data from one or more of the plurality of inputs to generate output data for transmission on one or more of the plurality of outputs.

3. The method of claim 1, further comprising:

validating the configuration of the plurality of configurable hardware blocks, wherein executing the configured plurality of configurable hardware blocks is performed responsive to the successful validation of the configuration.

4. The method of claim 1, wherein the plurality of configurable hardware blocks are structurally identical relative to one another.

5. The method of claim 1, wherein the function at least one of the plurality of functional modules is configured to perform is at least one of a command function, a Configure configurable hardware block function comprising providing and executing a configuration for a given configurable hardware block, a Report MCFS Data function comprising reporting a status and information regarding a particular MCFS, and a Report configurable hardware block data function comprising reporting a status and information regarding a particular configurable hardware block of the plurality of configurable hardware blocks.

6. The method of claim 1, wherein the plurality of configurable hardware blocks include at least one of a bus coupler module, a starter module, and a safe starter module.

7. The method of claim 1, wherein the determining a respective Motor Control Function Set (MCFS) comprises selecting a MCFS to determine a particular motor control switch configuration.

8. A method, comprising:

receiving a request to implement a first controller for a motor control switch for an industrial application;

determining a plurality of functional modules for the first controller, wherein each of the plurality of functional modules comprises an instance of computer logic configured to perform a respective function;

determining a respective Motor Control Function Set (MCFS) for performing the respective function of each of the plurality of functional modules;

identifying a plurality of configurable hardware blocks that are available for implementing the first controller, wherein the plurality of configurable hardware blocks include at least one of a bus coupler module, a starter module, a safe starter module, a Power Interface Module (PIM), an analog/digital Input/output Module (IOM), Voltage Input Module (VIM), and a Safety Interface Module (SIM);

allocating one or more of the plurality of configurable hardware blocks to each of the plurality of functional modules, wherein at least two of the plurality of configurable hardware blocks are allocated to a first one of the plurality of functional modules;

configuring each of the plurality of configurable hardware blocks based on the MCFS of the functional module to which the respective configurable hardware block is allocated; and executing the configured plurality of configurable hardware blocks as a distributed system to control the motor control switch for the industrial application, wherein allocating one or more of the plurality of configurable hardware blocks to each of the plurality of functional modules further comprises:

reserving at least one configurable hardware block of the plurality of configurable hardware blocks as a redundant backup device, such that the reserved at least one configurable hardware block is not currently allocated to any of the plurality of functional modules.

9. The method of claim 8, further comprising:

subsequent to executing the configured plurality of configurable hardware blocks as the distributed system to control the motor control switch, determining that a first hardware block in the configured plurality of configurable hardware blocks has experienced an error state, wherein at least a portion of the MCFS for a first functional module was allocated to the first hardware block;

allocating the reserved at least one configurable hardware block to the first functional module;

configuring the reserved at least one configurable hardware block based on the at least a portion of the MCFS of the first functional module; and executing the reserved configured plurality of configurable hardware blocks as a distributed system to control the motor control switch.

10. A system, comprising:

one or more computer processors; and a memory containing computer program code that, when executed by operation of the one or more computer processors, performs an operation comprising:

receiving a request to implement a first controller for a motor control switch for an industrial application;

determining a plurality of functional modules for the first controller, wherein each of the plurality of functional modules comprises an instance of computer logic configured to perform a respective function;

determining a respective Motor Control Function Set (MCFS) for performing the respective function of each of the plurality of functional modules;

identifying a plurality of configurable hardware blocks that are available for implementing the first controller, wherein the plurality of configurable hardware blocks include at least one of a bus coupler module, a starter module, a safe starter module, a Power Interface Module (PIM), an analog/digital Input/output Module (IOM), Voltage Input Module (VIM), and a Safety Interface Module (SIM);

allocating one or more of the plurality of configurable hardware blocks to each of the plurality of functional modules, wherein at least two of the plurality of configurable hardware blocks are allocated to a first one of the plurality of functional modules;

configuring each of the plurality of configurable hardware blocks based on the MCFS of the functional module to which the respective configurable hardware block is allocated; and executing the configured plurality of configurable hardware blocks as a distributed system to control the motor control switch for the industrial application, wherein allocating one or more of the plurality of configurable hardware blocks to each of the plurality of functional modules further comprises:

determining two or more potential allocations of configurable hardware blocks from the plurality of configurable hardware blocks to a first functional module of the plurality of functional modules, wherein a different number of configurable hardware blocks are allocated to the first functional module in at least two of the two or more potential allocations; and selecting one of the two or more potential allocations.

11. The system of claim 10, wherein the plurality of configurable hardware blocks each comprise a plurality of inputs, a plurality of outputs and one or more processing functions for processing input data from one or more of the plurality of inputs to generate output data for transmission on one or more of the plurality of outputs.

12. The system of claim 10, the operation further comprising:

validating the configuration of the plurality of configurable hardware blocks, wherein executing the configured plurality of configurable hardware blocks is performed responsive to the successful validation of the configuration.

13. The system of claim 10, wherein the plurality of configurable hardware blocks are structurally identical relative to one another.

14. A system, comprising:

one or more computer processors; and a memory containing computer program code that, when executed by operation of the one or more computer processors, performs an operation comprising:

receiving a request to implement a first controller for a motor control switch for an industrial application;

determining a plurality of functional modules for the first controller, wherein each of the plurality of functional modules comprises an instance of computer logic configured to perform a respective function;

determining a respective Motor Control Function Set (MCFS) for performing the respective function of each of the plurality of functional modules;

identifying a plurality of configurable hardware blocks that are available for implementing the first controller, wherein the plurality of configurable hardware blocks include at least one of a bus coupler module, a starter module, a safe starter module, a Power Interface Module (PIM), an analog/digital Input/output Module (IOM), Voltage Input Module (VIM), and a Safety Interface Module (SIM);

allocating one or more of the plurality of configurable hardware blocks to each of the plurality of functional modules, wherein at least two of the plurality of configurable hardware blocks are allocated to a first one of the plurality of functional modules;

configuring each of the plurality of configurable hardware blocks based on the MCFS of the functional module to which the respective configurable hardware block is allocated; and executing the configured plurality of configurable hardware blocks as a distributed system to control the motor control switch for the industrial application, wherein allocating one or more of the plurality of configurable hardware blocks to each of the plurality of functional modules further comprises:

reserving at least one configurable hardware block of the plurality of configurable hardware blocks as a redundant backup device, such that the reserved at least one configurable hardware block is not currently allocated to any of the plurality of functional modules.

15. The system of claim 14, the operation further comprising:

subsequent to executing the configured plurality of configurable hardware blocks as the distributed system to control the motor control switch, determining that a first hardware block in the configured plurality of configurable hardware blocks has experienced an error state, wherein at least a portion of the MCFS for a first functional module was allocated to the first hardware block;

allocating the reserved at least one configurable hardware block to the first functional module;

configuring the reserved at least one configurable hardware block based on the at least a portion of the MCFS of the first functional module; and executing the reserved configured plurality of configurable hardware blocks as a distributed system to control the motor control switch.

16. A non-transitory computer-readable medium containing computer program code that, when executed by operation of one or more computer processors, performs an operation comprising:

receiving a request to implement a first controller for a motor control switch for an industrial application;

determining a plurality of functional modules for the first controller, wherein each of the plurality of functional modules comprises an instance of computer logic configured to perform a respective function;

determining a respective Motor Control Function Set (MCFS) for performing the respective function of each of the plurality of functional modules;

identifying a plurality of configurable hardware blocks that are available for implementing the first controller, wherein the plurality of configurable hardware blocks include at least one of a bus coupler module, a starter module, a safe starter module, a Power Interface Module (PIM), an analog/digital Input/output Module (IOM), Voltage Input Module (VIM), and a Safety Interface Module (SIM);

allocating one or more of the plurality of configurable hardware blocks to each of the plurality of functional modules, wherein at least two of the plurality of configurable hardware blocks are allocated to a first one of the plurality of functional modules;

configuring each of the plurality of configurable hardware blocks based on the MCFS of the functional module to which the respective configurable hardware block is allocated; and executing the configured plurality of configurable hardware blocks as a distributed system to control the motor control switch for the industrial application, wherein allocating one or more of the plurality of configurable hardware blocks to each of the plurality of functional modules further comprises:

determining two or more potential allocations of configurable hardware blocks from the plurality of configurable hardware blocks to a first functional module of the plurality of functional modules, wherein a different number of configurable hardware blocks are allocated to the first functional module in at least two of the two or more potential allocations; and selecting one of the two or more potential allocations.

17. The non-transitory computer-readable medium of claim 16, wherein the plurality of configurable hardware blocks each comprise a plurality of inputs, a plurality of outputs and one or more processing functions for processing input data from one or more of the plurality of inputs to generate output data for transmission on one or more of the plurality of outputs.

18. The non-transitory computer-readable medium of claim 15, the operation further comprising:

validating the configuration of the plurality of configurable hardware blocks, wherein executing the configured plurality of configurable hardware blocks is performed responsive to the successful validation of the configuration.

19. The non-transitory computer-readable medium of claim 16, wherein allocating one or more of the plurality of configurable hardware blocks to each of the plurality of functional modules further comprises:

reserving at least one configurable hardware block of the plurality of configurable hardware blocks as a redundant backup device, such that the reserved at least one configurable hardware block is not currently allocated to any of the plurality of functional modules;

subsequent to executing the configured plurality of configurable hardware blocks as the distributed system to control the motor control switch, determining that a first hardware block in the configured plurality of configurable hardware blocks has experienced an error state, wherein at least a portion of the MCFS for a first functional module was allocated to the first hardware block;

allocating the reserved at least one configurable hardware block to the first functional module;

configuring the reserved at least one configurable hardware block based on the at least a portion of the MCFS of the first functional module; and executing the reserved configured plurality of configurable hardware blocks as a distributed system to control the motor control switch.

20. The non-transitory computer-readable medium of claim 16, wherein the plurality of configurable hardware blocks are structurally identical relative to one another.

21. A system, comprising:

one or more computer processors; and a memory containing computer program code that, when executed by operation of the one or more computer processors, performs an operation comprising:

receiving a request to provide controller functionality for a motor control switch for an industrial application using a distributed controller, wherein the distributed controller comprises a plurality of functional modules, each comprising an instance of computer logic configured to perform a respective function;

identifying a plurality of configurable hardware blocks that are available for implementing the controller functionality, wherein the plurality of configurable hardware blocks include at least one of a bus coupler module, a starter module, a safe starter module, a Power Interface Module (PIM), an analog/digital Input/output Module (IOM), Voltage Input Module (VIM), and a Safety Interface Module (SIM);

allocating one or more of the plurality of configurable hardware blocks to each of the plurality of functional modules;

determining a respective configuration for each of a plurality of functional modules to implement a distributed system that provides the controller functionality for the motor control switch;

configuring each of the plurality of configurable hardware blocks, based on the determined configurations for each of the plurality of functional modules; and executing the configured plurality of configurable hardware blocks as the distributed system to control the motor control switch for the industrial application, wherein allocating one or more of the plurality of configurable hardware blocks to each of the plurality of functional modules further comprises:

determining two or more potential allocations of configurable hardware blocks from the plurality of configurable hardware blocks to a first functional module of the plurality of functional modules, wherein a different number of configurable hardware blocks are allocated to the first functional module in at least two of the two or more potential allocations; and selecting one of the two or more potential allocations.

22. A system, comprising:

one or more computer processors; and a memory containing computer program code that, when executed by operation of the one or more computer processors, performs an operation comprising:

receiving a request to provide controller functionality for a motor control switch for an industrial application using a distributed controller, wherein the distributed controller comprises a plurality of functional modules, each comprising an instance of computer logic configured to perform a respective function;

identifying a plurality of configurable hardware blocks that are available for implementing the controller functionality, wherein the plurality of configurable hardware blocks include at least one of a bus coupler module, a starter module, a safe starter module, a Power Interface Module (PIM), an analog/digital Input/output Module (IOM), Voltage Input Module (VIM), and a Safety Interface Module (SIM);

allocating one or more of the plurality of configurable hardware blocks to each of the plurality of functional modules;

determining a respective configuration for each of a plurality of functional modules to implement a distributed system that provides the controller functionality for the motor control switch;

configuring each of the plurality of configurable hardware blocks, based on the determined configurations for each of the plurality of functional modules; and executing the configured plurality of configurable hardware blocks as the distributed system to control the motor control switch for the industrial application, wherein allocating one or more of the plurality of configurable hardware blocks to each of the plurality of functional modules further comprises:

reserving at least one configurable hardware block of the plurality of configurable hardware blocks as a redundant backup device, such that the reserved at least one configurable hardware block is not currently allocated to any of the plurality of functional modules.

23. A non-transitory computer-readable medium containing computer program code that, when executed by operation of one or more computer processors, performs an operation comprising:

receiving a request to implement a first controller for a motor control switch for an industrial application;

determining a plurality of functional modules for the first controller, wherein each of the plurality of functional modules comprises an instance of computer logic configured to perform a respective function;

determining a respective Motor Control Function Set (MCFS) for performing the respective function of each of the plurality of functional modules;

identifying a plurality of configurable hardware blocks that are available for implementing the first controller, wherein the plurality of configurable hardware blocks include at least one of a bus coupler module, a starter module, a safe starter module, a Power Interface Module (PIM), an analog/digital Input/output Module (IOM), Voltage Input Module (VIM), and a Safety Interface Module (SIM);

allocating one or more of the plurality of configurable hardware blocks to each of the plurality of functional modules, wherein at least two of the plurality of configurable hardware blocks are allocated to a first one of the plurality of functional modules;

configuring each of the plurality of configurable hardware blocks based on the MCFS of the functional module to which the respective configurable hardware block is allocated; and executing the configured plurality of configurable hardware blocks as a distributed system to control the motor control switch for the industrial application, wherein allocating one or more of the plurality of configurable hardware blocks to each of the plurality of functional modules further comprises:

reserving at least one configurable hardware block of the plurality of configurable hardware blocks as a redundant backup device, such that the reserved at least one configurable hardware block is not currently allocated to any of the plurality of functional modules.

24. The non-transitory computer-readable medium of claim 23, the operation further comprising:

subsequent to executing the configured plurality of configurable hardware blocks as the distributed system to control the motor control switch, determining that a first hardware block in the configured plurality of configurable hardware blocks has experienced an error state, wherein at least a portion of the MCFS for a first functional module was allocated to the first hardware block;

allocating the reserved at least one configurable hardware block to the first functional module;

configuring the reserved at least one configurable hardware block based on the at least a portion of the MCFS of the first functional module; and executing the reserved configured plurality of configurable hardware blocks as a distributed system to control the motor control switch.

* * * * *